(12) United States Patent
O'Shea et al.

(10) Patent No.: US 11,673,782 B2
(45) Date of Patent: Jun. 13, 2023

(54) APPARATUS AND METHOD FOR LIFTING AN ELONGATED CONTAINER

(71) Applicant: PILZ GMBH & CO. KG, Ostfildern (DE)

(72) Inventors: Wesley O'Shea, Cork (IE); Andrew Donnelly, Cork (IE); Padraig Cahalane, Cork (IE); Cathal Owens, Cork (IE)

(73) Assignee: Pilz GmbH & Co. KG, Ostfildern (DE)

( * ) Notice: Subject to any disclaimer, the term of this patent is extended or adjusted under 35 U.S.C. 154(b) by 293 days.

(21) Appl. No.: 17/038,545

(22) Filed: Sep. 30, 2020

(65) Prior Publication Data

US 2021/0107777 A1   Apr. 15, 2021

(30) Foreign Application Priority Data

Sep. 30, 2019 (EP) ..................... 19200594

(51) Int. Cl.
*B66F 9/18* (2006.01)
*B65D 8/00* (2006.01)

(52) U.S. Cl.
CPC .............. *B66F 9/187* (2013.01); *B66F 9/181* (2013.01); *B65D 9/04* (2013.01)

(58) Field of Classification Search
CPC ........ B66C 1/625; B65G 47/90; B65G 47/91; B65G 2201/0241; B25J 15/0616; B66F 9/187; B66F 9/181
USPC ................................................. 414/403, 408
See application file for complete search history.

(56) References Cited

U.S. PATENT DOCUMENTS

| | | | |
|---|---|---|---|
| 2,756,888 A * | 7/1956 | Avery ..................... | B66F 9/187 414/665 |
| 4,175,903 A * | 11/1979 | Carson ..................... | B65F 3/04 294/902 |
| 10,450,176 B1 * | 10/2019 | Beard ..................... | B66F 9/187 |

FOREIGN PATENT DOCUMENTS

| | | | | |
|---|---|---|---|---|
| CN | 107745972 A | * | 3/2018 | .......... B25J 15/0616 |
| CN | 208648129 U | | 3/2019 | |
| FR | 3000915 A1 | * | 7/2014 | .......... B25J 15/0052 |
| FR | 3008402 A1 | * | 1/2015 | .............. B66C 1/02 |
| NL | 1017970 C2 | | 11/2002 | |

OTHER PUBLICATIONS

Manut LM; "Aide à la manutention dans le secteur des vins & spiritueux"; https://www.manutlm.com/sites/default/files/2019-06/fiche%20secteur%20vins%20et%20spiritueux.pdf; Jan. 15, 2021; 2 pages.

(Continued)

*Primary Examiner* — Kaitlin S Joerger
(74) *Attorney, Agent, or Firm* — Miller Johnson

(57) ABSTRACT

An elongated container has a convex shape with a bulge defining a center width of the elongated container. An apparatus and method for lifting the elongated container are described. The apparatus performs a pick operation from a front side of the elongated container. The pick operation includes approaching and gripping the elongated container from the front side. During the pick operation, an outer dimension of the apparatus in a direction perpendicular to an elongated direction defined by the elongated container is smaller than the center width of the elongated container.

18 Claims, 9 Drawing Sheets

(56) References Cited

OTHER PUBLICATIONS

Tom Beard Company; "Barrel Picker Operation Manual"; http://tombeard.com/media/PDF/Barrel-Picker-Operation-Manual.pdf; Jan. 16, 2021; 13 pages.
Kawasaki Robotics UK; "Robots handling barrels at Speyside Cooperage"; https://www.youtube.com/watch?v=oDtx9XIacOY; Aug. 8, 2013; 2 pages.

* cited by examiner

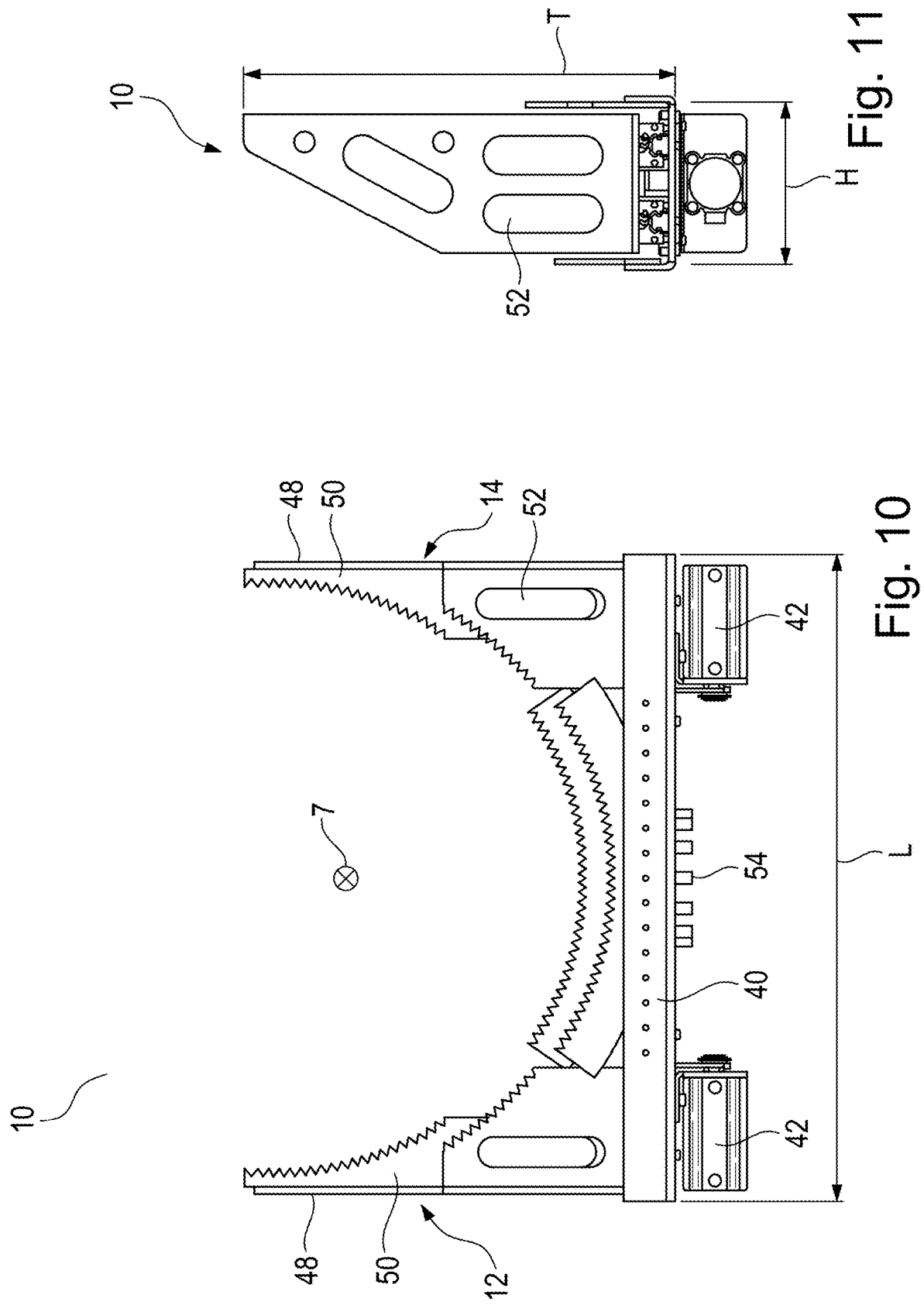

APPARATUS AND METHOD FOR LIFTING AN ELONGATED CONTAINER

CROSS-REFERENCE TO RELATED APPLICATIONS

This application claims priority to European Application No. 19 200 594.0 filed Sep. 30, 2019. The entire disclosure of the application referenced above is incorporated by reference.

FIELD

The present disclosure relates to an apparatus and method for lifting an elongated container.

BACKGROUND

In spirit industry, wooden barrels (casks) are used as aging barrels to age wine, distilled spirits such as whiskey and brandy, rum or beer. Beverages aged in wooden barrels take on some of the compounds in the barrel, such as vanillin or wood tannins. For some beverages, in particular whiskey, aging is wooden barrels is mandatory in order to be recognized as a special spirit drink. In the EU, for instance, before a spirit drink is recognized as whiskey and allowed to bear a corresponding label, a maturation of the final distillate for at least three years in wooden barrels not exceeding 700 liters capacity is required.

Barrels can be used multiple times for maturing beverages. However, since in the USA special laws require use of new barrels for several popular types of whiskey, oftentimes whiskey made elsewhere is aged in used barrels that previously contained American whiskey (usually bourbon whiskey). Used barrels are thus shipped from the USA to distillers around the world to be reused. Generally, for air, road and sea transport, the barrels are stored in standard shipping containers, which have to be unloaded and inspected at the distilleries before they are filled with new raw spirit.

Thus, a significant challenge for the whiskey industry is the loading and unloading of barrels both empty and full for shipment, storage and distribution. The common approach to this is to load and unloaded the barrels manually. This cumbersome process is not only time-consuming and personnel-intensive, but also often associated with a high accident risk. Therefore, automation of this process is highly desirable.

However, since the barrels have a defined size that does not correspond nicely to the defined size of a shipping container, each batch is loaded slightly different into a shipping container. Furthermore, since the barrels are to be loaded as tightly as possible within the shipping container in order to minimize shipping costs, there is only small room to maneuver within the container for unloading the barrels. Thus, it is difficult to use standard automation equipment for the unloading process.

Furthermore, since the barrels are handmade and could already been used several times, they can deviate considerably from a defined standard with regard to size and condition. Therefore, when handling of theses barrels is to be automated, these variations have to be taken into account.

SUMMARY

It is an object of the present disclosure to provide an apparatus and method, which facilitate automation of the barrel handling. Furthermore, it is an object to provide an apparatus and method, which facilitate loading and unloading of the barrels from a shipping container. Further, it is an object to provide means, which allow handling of the barrels in a simple, safe and fast manner. Yet further, it is an object to provide means for handling barrels automatically regardless of any restriction implied due to the condition of the barrels or their means of transportation.

According to an aspect of the present disclosure, there is provided an apparatus for lifting an elongated container. The elongated container has a convex shape with a circular top surface, a circular bottom surface parallel to the top surface, and a convex outer surface which connects the top surface and the bottom surface forming a bulge at a center portion of the elongated container between the top surface and the bottom surface, the bulge defining a center width of the elongated container. The convex outer surface is a smooth surface comprising a front surface and a back surface defined by a center plane intersecting a center point of each of the top surface and the bottom surface, the front surface defining a front side of the elongated container. The apparatus is configured to perform a pick operation from the front side of the elongated container, the pick operation including approaching and gripping the elongated container from the front side. During the pick operation, an outer dimension of the apparatus in a direction perpendicular to an elongated direction defined by the elongated container is smaller than the center width of the elongated container.

According to a further aspect, there is provided a method for lifting an elongated container. The elongated container has a convex shape with a circular top surface, a circular bottom surface parallel to the top surface, and a convex outer surface which connects the top surface and the bottom surface forming a bulge at a center portion of the elongated container between the top surface and the bottom surface, the bulge defining a center width of the elongated container. The convex outer surface is a smooth surface comprising a front surface and a back surface defined by a center plane intersecting a center point of each of the top surface and the bottom surface, the front surface defining a front side of the elongated container. The method comprising: performing a pick operation from the front side of the elongated container, the pick operation including approaching and gripping the elongated container from the front side with a gripper, wherein, during the pick operation, an outer dimension of the gripper in a direction perpendicular to an elongated direction defined by the elongated container is smaller than the central width of the elongated container.

According to a further aspect of the present disclosure, there is provided a test unit for checking the operability of an imaging unit having a processing unit and a projection unit, wherein the projection unit is configured to project a pattern with defined properties into a working area, and wherein the processing unit is configured to evaluate the image data acquired by the imaging unit, to detect the projected pattern and extract its specific properties, and wherein the processing unit is further configured to compare the specific properties of the detected projected pattern with the defined properties and/or to forward the specific properties of the detected projected pattern to a controller.

It is thus an idea to provide a dedicated apparatus (gripper) in order to facilitate automation of handling of elongated containers such as wooden barrels. Taking into account the general shape of such a container, the gripper is designed to engage the container only from a front side without the need of reaching around the container. Thereby, even if barrels of a defined shape are tightly stacked within a confined space, such as a shipping container, they can be handled by the gripper, since the gripper does not need to reach around the barrel for lifting it.

In particular, the gripper as part of an unloading device allows automation of an unloading process, where barrels are accessible only from one side. Thus, unloading of shipping container, which can only be opened on one side, by an automated or semi-automated machine becomes feasible. Thereby, an unloading process can be simplified and accelerated. Preferably, a worker only needs to open the shipping container while handling of the barrels is done assisted by a machine equipped with an apparatus according to the present disclosure. As a result, workers are less burdened and the risk of an accident causing personal injury is reduced.

Finally, by engaging the container to be lifted only from a front side, the actual dimension it becomes less relevant. The gripper is thus more tolerant towards changes in the actual size of the barrels and can thus be used more flexible for different types of barrels or barrels of different conditions.

In a further refinement, the outer dimension of the apparatus in the direction perpendicular to the elongated direction is smaller than 680 mm, for instance 650 mm. Assuming that a standard barrel has a diameter between 660 and 680 mm, the gripper can have an outer dimension of less than 680 mm. The out dimension may by 650 mm. The gripper can thus approach a container to be lifted from the front side without colliding with any sidewalls of a storage container in which the barrels may be stored.

In a further refinement, the apparatus comprises a first gripping member and a second gripping member configured to engage the smooth surface for lifting the elongated container, wherein the first gripping member and the second gripping member only engage on the front surface of the convex outer surface. In the context of this disclosure, "smooth surface" is to be understood as the unmodified surface of the elongated container. In other words, the elongated container has no protruding elements, which can be engaged for lifting the elongated container. The refinement thus contributes to a simplified handling of the containers, in which the containers do not have to be specially prepared to be handled by the apparatus.

In a further refinement, the apparatus further comprises a connecting member for connecting the first gripping member and the second gripping member to a lifting device. According to this refinement, the apparatus is connectable to a lifting device and can thus be flexibly used depending on the required application.

In a further refinement, the apparatus is an end of arm tooling (EOAT) of a robot. As an EOAT, the apparatus can be connected to a standard robot. Thus, the implementation of an automated loading or unloading system can be simplified by being able to use standard automation equipment such as an industrial robot.

In a further refinement, the apparatus is a mechanical gripper. A mechanical gripper can be implemented in a simple and robust manner and is usually less maintenance-intensive than other types of grippers.

In a further refinement a first and a second gripping member form a mechanical clamping, wherein at least the first gripping member is movable with respect to the second gripping member. A mechanical clamping can be realized with only a few moving parts and in a particular simple manner. The refinement thus further contributes to a cost effective design of an overall load and unloading system.

In a further refinement, an element of the first gripping member and/or the second gripping member comprises a jagged contour for engaging the outer surface of the elongated container. The jagged contour ensures a good hold on the smooth surface, if the surface is made from wood, for instance. Furthermore, with the help of the jagged contour the gripper can easily adjust to variation is the outer dimension of the elongated container.

In a further refinement, the apparatus is a pneumatic vacuum gripper. A pneumatic vacuum gripper can act directly on an object based on the force of an air pressure supplied to the gripper. A pneumatic vacuum gripper is thus able to attach itself to an object without relying on friction or form closure. Thereby, a pneumatic vacuum gripper is particularly suitable for engaging a smooth surface without protruding elements.

In a further refinement, the apparatus comprises a first and a second vacuum gripper as a first and a second gripping member. The first and second vacuum gripper can be large area vacuum grippers. With two vacuum grippers, the pneumatic vacuum gripper can attach itself on two positions on the front surface of the elongated container. Thereby, a secure hold can be guaranteed. In addition, the use of large-area vacuum grippers can compensate for irregularities on the outer surface, e.g. unevenness caused by hoops.

In a further refinement, the apparatus comprises at least three vacuum grippers for lifting the container. The apparatus may comprise four grippers. Using three or more grippers allows a smaller dimensioning of the individual grippers. This is beneficial, if vacuum grippers with integrated vacuum generation means are being used. Furthermore, using multiple grippers improves safety, since a container can still be hold if one of the grippers should fail.

In a further refinement, the apparatus is configured to lift a weight between 50-70 kg. Since a standard barrel weighs about 50-70 kg, the apparatus is configured to lift such a weight without additional support.

In a further refinement, a weight of the apparatus is less or equal to 30 kg. In order to be used on a standard robot, a weight of the tooling of less than 30 kg is advantageous, so that a standard robot can be used without additional adjustments. The possibility of using standard robots makes the implementation of a loading or unloading system particularly cost effective.

Further advantages will become apparent from the description and the enclosed drawing.

It goes without saying that the features mentioned before and those that will be explained hereinafter may not only be used in the particularly given combination but also in other combinations or alone without leaving the scope of the present invention.

BRIEF DESCRIPTION OF THE DRAWINGS

Embodiments of the invention are shown in the drawings and are explained in more detail in the following description.

FIG. 10 is a top view of the gripper of FIG. 9.

FIG. 11 is a side view of the gripper of FIG. 9.

DETAILED DESCRIPTION

Figure 1:
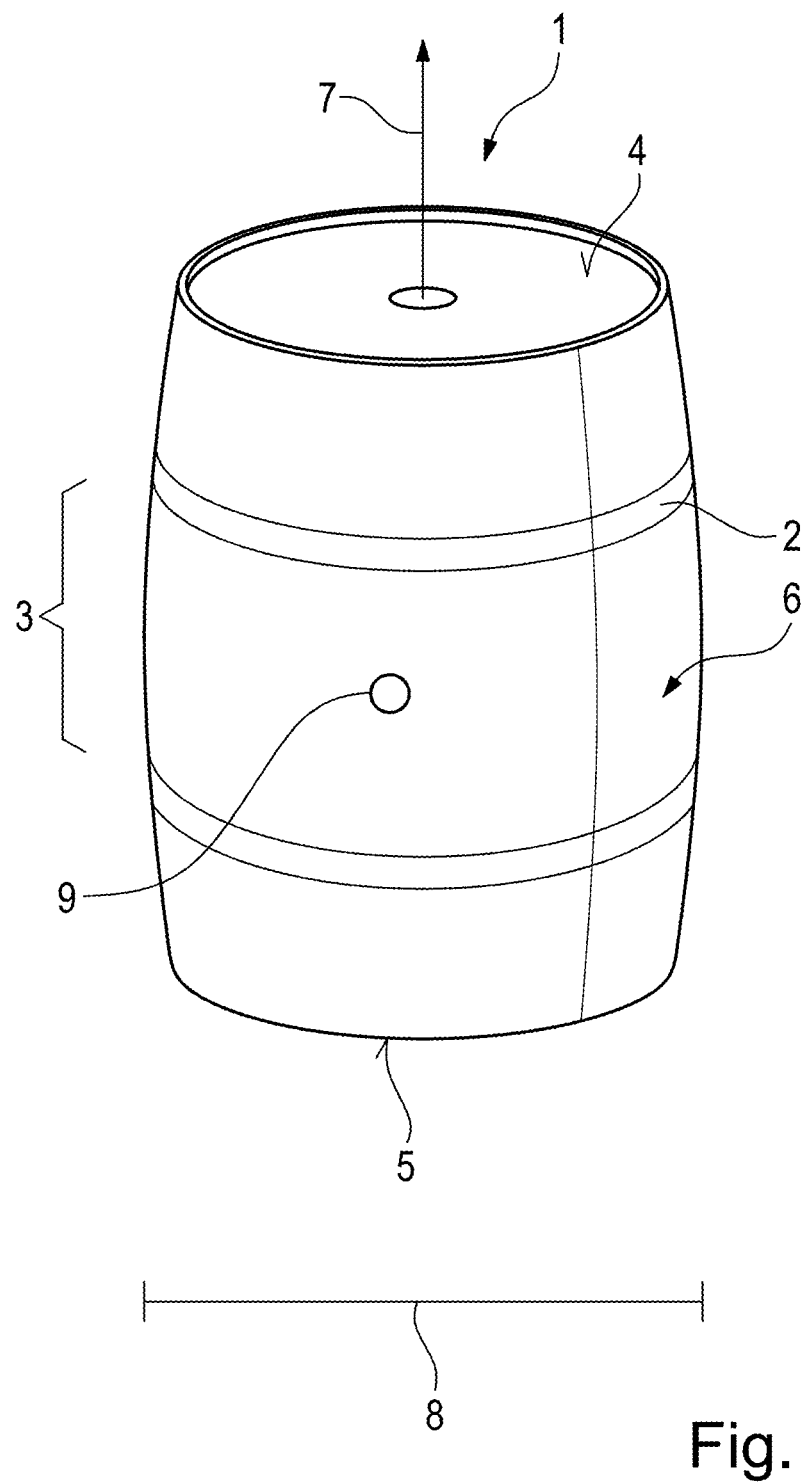
FIG. 1 is a simplified perspective view of an elongated container to be lifted by a gripper according to this disclosure.

FIG. 1 shows a simplified perspective view of an elongated container 1 for handling of which the gripper according to this disclosure has been specifically designed. With reference to FIG. 1, the general dimension of such a container will be described in the following.

The elongated container 1 can be a barrel or cask made from wooden staves, which can optionally be bounded by surrounding, wood or metal hoops 2. Such containers are used, for instance, as aging barrels to mature beverages such as wine, distilled spirits (whiskey, brandy), rum, beer or the like.

The elongated container 1 has a convex shape with a bulge 3 at the center, commonly called bilge. The unique shape facilitates manual handling and moving of the elongated container 1, particularly by rolling the container on its side and changing directions with little friction by slightly tiling the container.

Geometrically, the elongated container 1 is an elongated spheroid (rotational ellipsoid) with truncated tips so that circles of the same size are formed at the top and bottom. Accordingly, the shape of the elongated container 1 can be defined as a convex shape with a circular top surface 4, a circular bottom surface 5 parallel to the top surface 4, and a convex outer surface 6 which connects the top surface 4 and the bottom surface 5 forming the bulge 3 at a center portion between the top surface 4 and the bottom surface 5.

The top and bottom surface 4, 5 have the same dimension and are simply referred to as heads or headers. The direction perpendicular to the heads defines the elongated direction 7 of the container 1.

Further, a center width 8 of the container 1 is defined by the width of a cross section parallel to the top and bottom surface at the center portion. The center width 8 thus corresponds essentially to the diameter of the bulge 3. Due to the convex shape a diameter of the top surface 4 and a diameter of the bottom surface 5 is small than the center width 8. In other words, the center width 8 is wider than the width of a cross section parallel thereto at a top surface side and a bottom surface side. Accordingly, the bulge forms the widest part of the container 1.

The raw material of the container 1 can be wood, for instance, rough oak wood such as *Quercus alba, Quercus robur* or *Quercus petraea* (also known as American oak or French oak). Further, the container can comprise hoops 2 that surround the container and hold the wood staves together. The hoops 2 are formed as metal bands usually made of galvanized iron. The hoops 2 are optionally and their position on the barrel may vary depending on the type and origin of the barrel. For instance, an American barrel may feature six hoops, while a French barrel features eight hoops. Generally, a barrel comprises at least one hoop at the top surface side and one hoop at the bottom surface side, called head or chime hoop. The remaining hoops are distributed over the convex outer surface 6. The bulge 3 generally comprises a bunghole 9 for filling and thus remains free of hoops.

Particularly, when used as aging barrels, handmade barrels are used which naturally can vary in size. Thus, even if "standardized" barrels are used, their outer dimension may vary. Further, since wood is a natural product and aging barrels are reused multiple times, the quality of the used material may change over time. The gripper, which is disclosed herein, has thus to be able to adjust to these circumstances. Accordingly, the gripper is designed for handling containers that can vary to a defined extent in size and quality.

The gripper according to the present disclosure is designed to handle elongated containers with a weight between 50 to 70 kg, for instance 60 kg. Furthermore, the gripper is designed to handle elongated containers having a height between 890-900 mm and a center width between 660-680 mm. A diameter of the top surface and the bottom surface can be between 590 mm to 610 mm. In addition, the gripper is designed to handle the elongated containers regardless of hoops surrounding the convex outer surface. In particular, the gripper does not rely on any mounting support such as mounting brackets, openings, notches etc. to engage the container for lifting.

Figure 2:
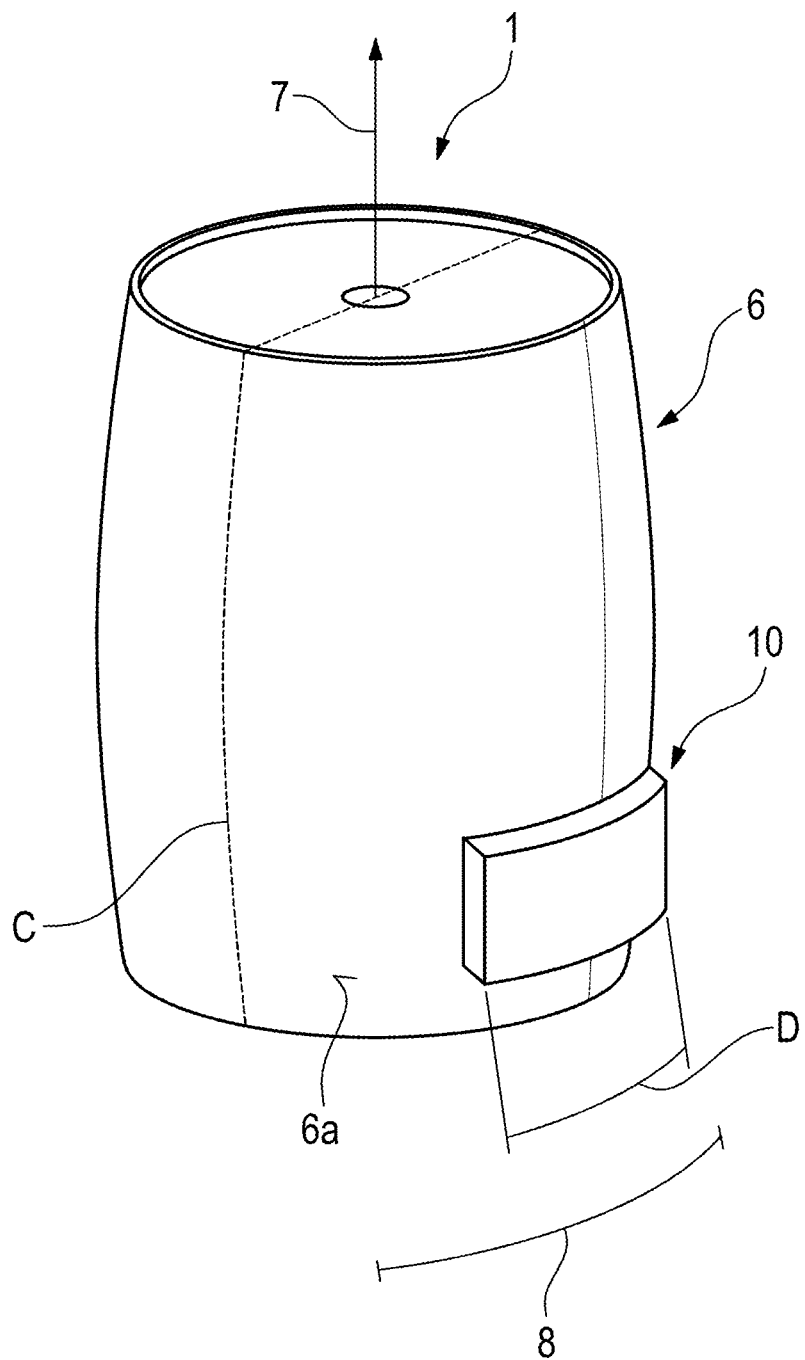
FIG. 2 is a schematic view of a gripper according to an embodiment of the present disclosure.

With reference to FIG. 2, a general description of a gripper according to the present disclosure is given, before specific example embodiments are described with reference to FIG. 5 and FIG. 9. Throughout the drawings, the same reference signs denote the same parts, which are described herein only once.

FIG. 2 shows a gripper according to the present disclosure schematically. The gripper in its entirety is denoted with reference numeral 10.

The gripper 10 is design to handle a specific elongated container 1 as described above. Further, the gripper 10 is designed to handle the specific container under specific conditions and constrains, which will be outlined with reference to FIG. 3.

Figure 3:
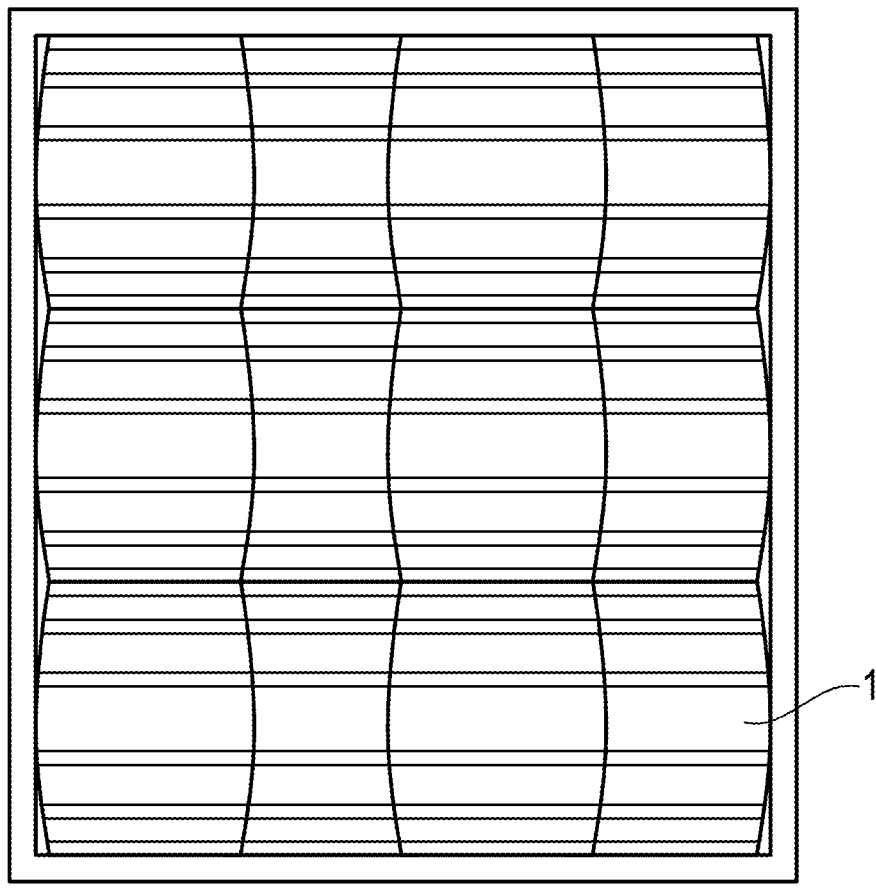
FIG. 3 is a top view of an example shipping container in which barrels are stored.
Figure 4:
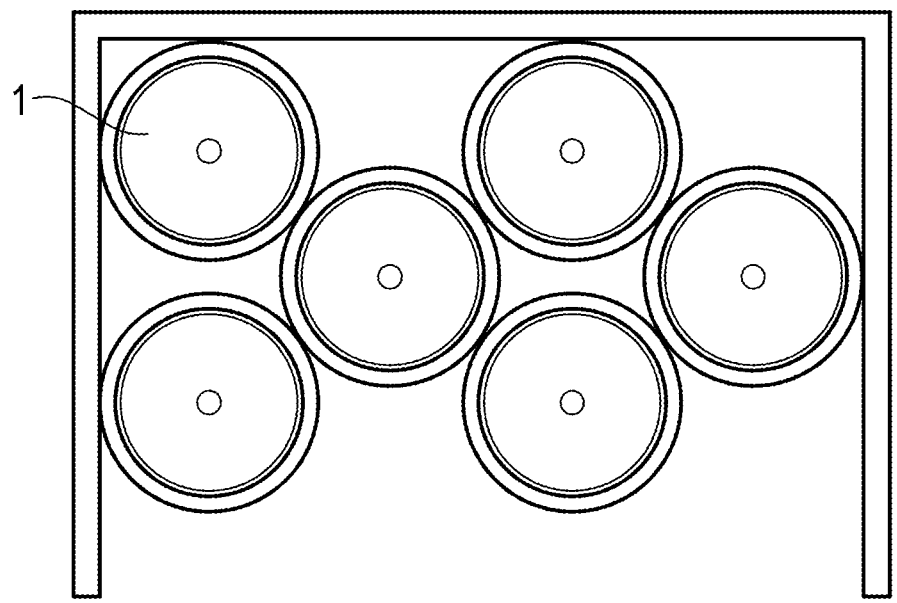
FIG. 4 is a side view of an example shipping container in which barrels are stored.

FIGS. 3 and 4 demonstrate a typical application for the gripper 10. In particular, FIGS. 3 and 4 show side and top views, respectively, of a shipping container in which barrels as described above are stored for road and sea transport. In the shown example, the barrels are stacked into stacks of three barrels each and pushed into the container as tight as possible. Usually, due to the fixed width of the container and the defined width of the barrels, the barrels will not be arranged in ordered rows within the container and thus each batch will look differently. The stacking and the arrangement within the confined space requires special unloading means.

In particular, a gripper for unloading is not able reach around the elongated containers, since the elongated containers are too close to each other and too close to a sidewall of a shipping container. The gripper according to the present disclosure is thus configured such that an outer dimension D of the gripper in a direction perpendicular to the elongated direction 7 of the elongated container does not extend beyond the center width 8 of the elongated container 1 in a pick operation (FIG. 2). The pick operation includes here approaching and gripping of the elongated container 1 for lifting.

In other words, the outer dimension D of the gripper 10 in a direction perpendicular to the elongated direction 7 is smaller than the center width 8 of the elongated container 1. The outer dimension D of the gripper in a direction perpendicular to the elongated direction can be smaller than 680 mm. The outer dimension can be smaller than 650 mm. Thereby, in becomes possible to engage the containers only from one side.

The gripper 10 is thus designed to engage the smooth outer surface 6 of the container. That is, the gripping member 10 is configured to engage the outer surface 6 without engaging in or with any particular mounting means arranged on the container 1. Accordingly, the gripper 10 establishes an operative connection with the outer surface 6 alone, to pick up a raw barrel, which has not been specially prepared for lifting.

Furthermore, the gripper 10 is configured to engage a front side of the elongated container. The front side is defined as one half of the outer surface 6 (front surface 6a), when the elongated container is sliced along a center plane C intersecting the centers of the circular top and bottom surface 4, 5. Thus, when viewed from the side, the gripper 10 engages only the visible side of the convex outer surface of the elongated container. In other words, at a picking position, the gripper 10 is attached to the outer surface 6 of the elongated container only at the front surface 6a.

In various implementations, the gripper 10 is designed as a detachable unit, which can be arranged on a lifting device such as a robot or a forklift. In particular, the gripper 10 can be an end of arm tooling (EOAT) of a robot. The weight of the gripper 10 can be less than or equal to 30 kg in order to function as EOAT of a standard robot. The gripper 10 may operate as a detachable unit on an autonomously operating lifting device to perform an unloading operation of a standard shipping container autonomously.

Figure 5:
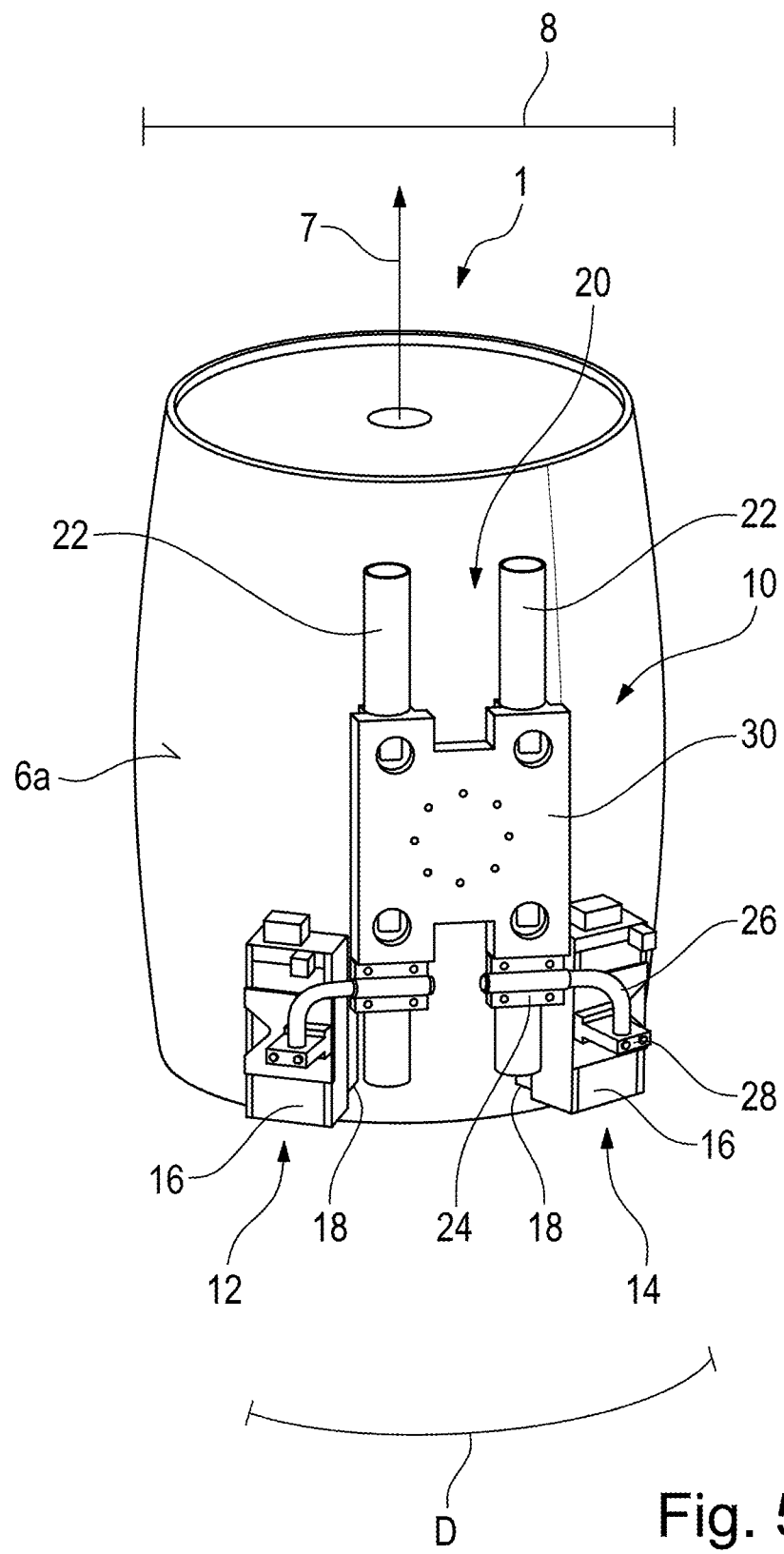
FIG. 5 is a perspective view of a first example embodiment of a gripper according to the present disclosure.

FIG. 5 shows a first example embodiment of a gripper 10 according to the present disclosure. In this embodiment, the gripper 10 is a pneumatic vacuum gripper.

In this embodiment, the gripper 10 comprises a first gripping member 12 and a second gripping member 14 for engaging the outer surface 6 of the elongated container 1. The first gripping member 12 is a first vacuum gripper and the second gripping member 14 is a second vacuum gripper.

A vacuum gripper 16 is device that utilizes a vacuum flow to attach itself to an object. In particular, a vacuum gripper utilizes a difference between an atmospheric pressure (equal to the weight of the air above your head) and a negative pressure (also referred to as "vacuum") to provide the ability to perform actions such as lifting, holding, moving, and so on. The vacuum gripper 16 can be equipped with integrated vacuum generation means. That is, a pump for generating the vacuum flow can be integrated into the vacuum gripper 16. Alternatively, vacuum generation means can also be provided separately form the vacuum gripper 16.

The vacuum gripper 16 can be a large area vacuum gripper. A large area vacuum gripper is vacuum gripper having a suction mat 18, which distributes the vacuum flow over a defined area. The mat 18 can be made of a technical foam with different pitch holes and thickness. Alternatively, a vacuum gripper 16 can be equipped with a plurality of individual suction cups in order to provide a holding area of a defined size.

Large area vacuum grippers are particularly suitable for uneven or heterogeneous surfaces. Thereby, different surface qualities can be account for and unevenness can be compensated, for instance, unevenness created on the outer surface of barrel by surrounding hoops 2.

In FIG. 5, the gripper 10 comprises a first gripping member 12 and a second gripping member 14 which are connected to a common holding structure 20. The holding structure 20 comprises in this embodiment two tubes 22, which in pick position extend along the elongated direction 7 of the elongated container 1. On each tube 22 a cross clamp 24 is attached holding a small pipe 26 with a ball joint 28 at the end. The first and the second gripping member 12, 14 are mounted on the ball joint 28 and bend corresponding to the expected convex outer surface 6 of the elongated container 1. The first and the second gripping member 12, 14 can be mounted with play on the ball joints 28 to be adjustable to variances in the shape of the elongated container 1.

The tubes 22 are joint together by a connecting member 30, which is designed here in shape of a plate. The connecting member 30 serves for flange mounting the gripper 10 to a lifting device such as a robot or forklift (not shown here).

FIG. 5 shows the gripper 10 in pick position in which the gripper 10 is attached to the elongated container 1. In this embodiment the first gripping member 12 and the second gripping member, 14 are mounted in parallel in a direction perpendicular to the elongated direction 7. The first gripping member 12 and the second gripping member 14 are the outermost elements of the gripper 10 in the direction perpendicular to the elongated direction 7 and thus define the outer dimension D of the gripper 10 in this direction. As can be seen from FIG. 5, the outer dimension D is smaller than the center width 8 of the elongated container 1. Accordingly, the gripper 10 is capable of performing a picking operation only from a front side 6a of the container 1 without extending beyond the container 1.

It shall be noted that a pneumatic vacuum gripper is not limited to the depicted design. Other holding structures are conceivable as long as an outer dimension of the gripper in a direction perpendicular to the elongated direction does not extend beyond the outer dimension of the elongated container in that direction. However, the tube design as shown here allows for a lightweight design on which the gripping members can easily be mounted and adjusted using the ball joints.

Figure 6:
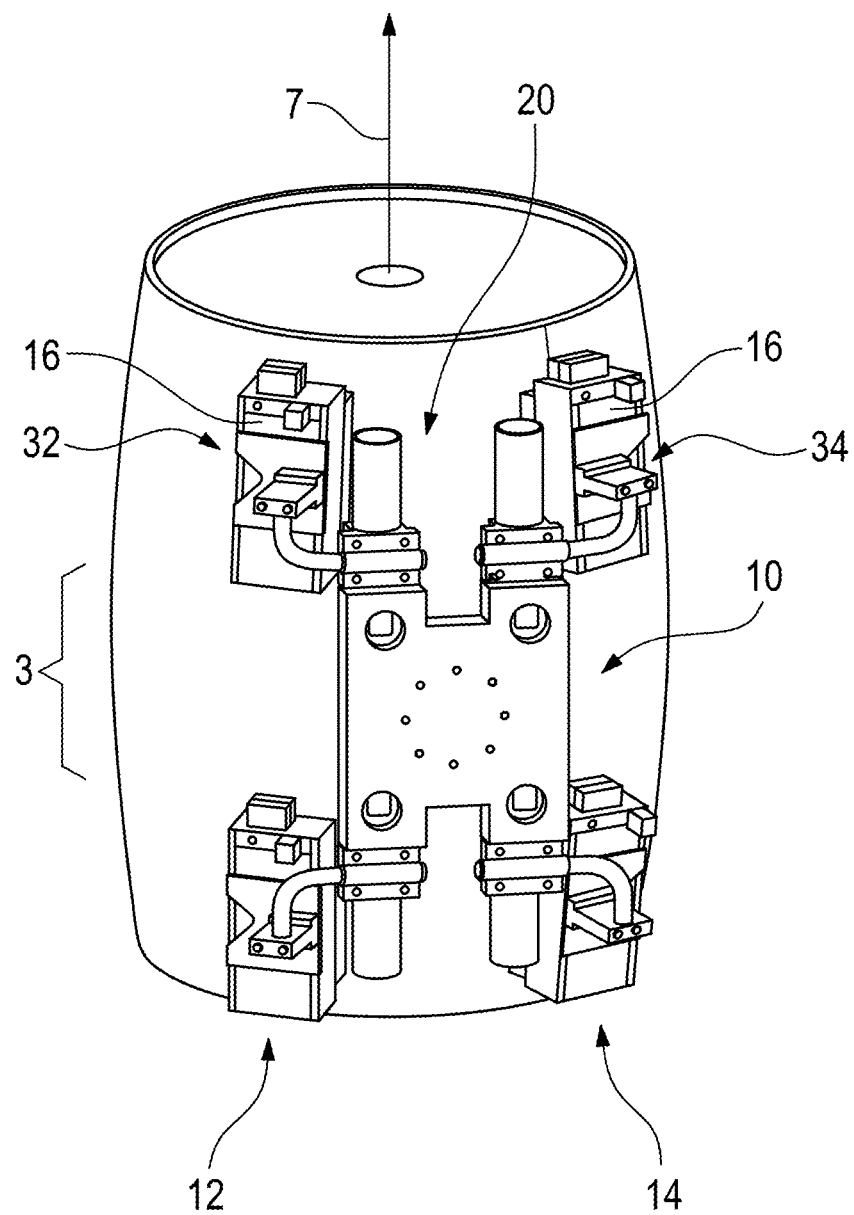
FIG. 6 is a perspective view of a variant of the example embodiment of FIG. 5.

FIG. 6 shows a variant of the example embodiment of FIG. 5. In addition to the first and second gripping member 12, 14, the gripper 10 according to FIG. 6 further includes a third and a fourth gripping member 32, 34. The third and fourth gripping member 32, 34 are designed identically to the first and second gripping member 12, 14. Accordingly, the third and fourth gripping member 32, 34 are also vacuum grippers 16, which are attached to the common holding structure 20. The third and fourth gripping member 32, 34 are arranged shifted along the elongated direction 7 parallel to the first and second gripping member 12, 14.

The third and fourth gripping member 32, 24 can extend to the same extent from the holding structure 20 than the first and the second gripping member 12, 14. In particular, they do not extend further than the outer dimension in a direction perpendicular to the elongated direction 7 defined by the first and the second gripping member 12, 14, and if, at least not beyond the center width 8 of the elongated container 1.

In various embodiments, the connecting element 30 forms a central element of the gripper 10, from which the gripping members 12, 14, 32, 34 are equally spaced. Accordingly, in pick position, the central element is arranged at the bulge 3 of the container 1 and the first and the second gripper element 12, 14 are attached on a lower part of the container 1 and the third and fourth gripper 32, 24 are attached on upper part of the container 1 corresponding to the symmetry of the container 1. Gripping members arranged in the lower and in the upper part of the container 1 have the advantage that the container 1 can not only be lifted vertically, but also rotated horizontally. Accordingly, the gripper 10 is able to pick up containers 1 from a vertical and bring them into a horizontal position.

In addition, the equipment with four grippers 12, 14, 32, 34 allows a smaller dimensioning of the individual grippers. This is beneficial if vacuum grippers 16 with integrated vacuum generation means are being used. Furthermore, using multiple grippers improves safety, since a container 1 can still be hold if one of the grippers should fail.

Figure 7:
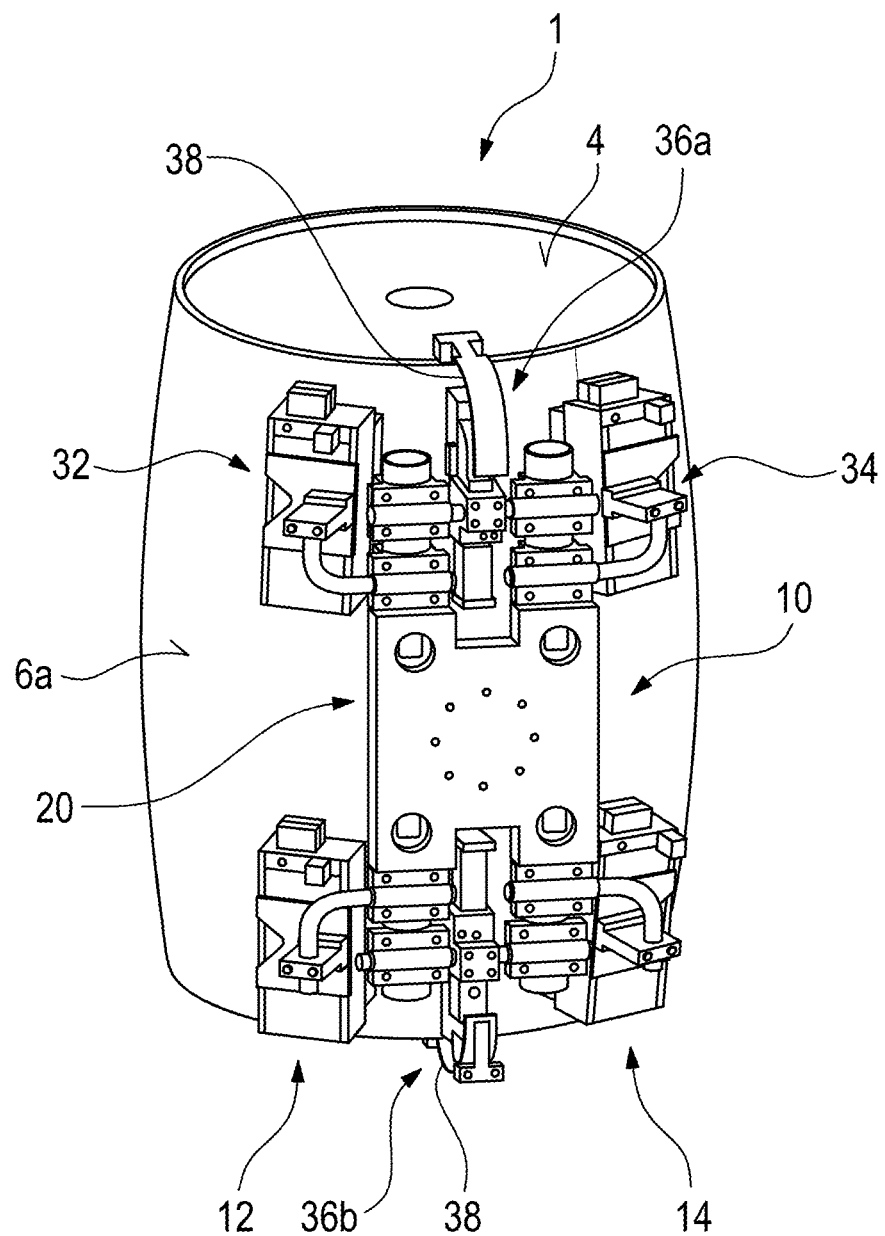
FIG. 7 is a perspective view of a further variant of the example embodiment of FIG. 5.

FIG. 7 shows a further variant of the example embodiment of FIG. 5. In addition to the third and fourth gripping member 32, 34, the gripper 10 comprises at least one support member for securing the elongated container 1 during a moving operation. The embodiment according to FIG. 7 comprises a first supporting member 36a and a second supporting member 36b, which are both arranged on the common holding structure 20 using similar means as for the gripping members 12, 14, 32, 34.

The first support member 36a is arranged on a top part of the holding structure 20 and comprises a clamp element 38 movable between a first position and a second position. During a picking operation, the clamp element 38 is in the first position away from the elongated container 1. After the picking operation and before a subsequent moving operation the clamp element 38 is moved from the first position into the second position. In the second position (as shown in FIG. 7), the clamp element 38 engages the elongated container 1 in addition to the gripping members 12, 14, 32, 34 and secures the container 1 during a moving operation.

In particular, during the moving operation the support members 36a, 36b reach around the front surface 6a to engage the container 1 and to provide additional support. In the embodiment according to FIG. 7, the first support member 36a reaches around a top boarder (chime) of the elongated container 1 and engages the top surface 4. Accordingly, the support member is able to extend beyond the front surface 6a and thus the outer dimension of the elongated container 1 during a moving operation, while during the picking operation the support member is in a position (first position) in which it does not extend beyond the outer dimension of the container 1.

The second support member 36b according to FIG. 7 is arranged on a bottom part of the holding structure 20 and is designed in the same way as the first support member 36a. Instead of engaging the top surface 4, the second support member 36b engages the bottom surface 5 of the elongated container 1 during a moving operation. Thereby, according to the embodiment of FIG. 7, the elongated container 1 is supported on the top side and the bottom side of the elongated container 1 allowing a firm support during movement.

It shall be noted that the support members 36a, 36b as disclosed in FIG. 7 only represent examples how the container 1 can be further support during a moving operation. Other support structures are conceivable. However, it is essential for any support structure that it does not extend beyond the dimension of the elongated container 1 during the picking operation, so that the container 1 can be picked up under the above-described imposed conditions. Accordingly, the support structure can only engage the container after the picking operation, once the container has been lifted up and moved away from any enclosing boundaries.

Figure 8:
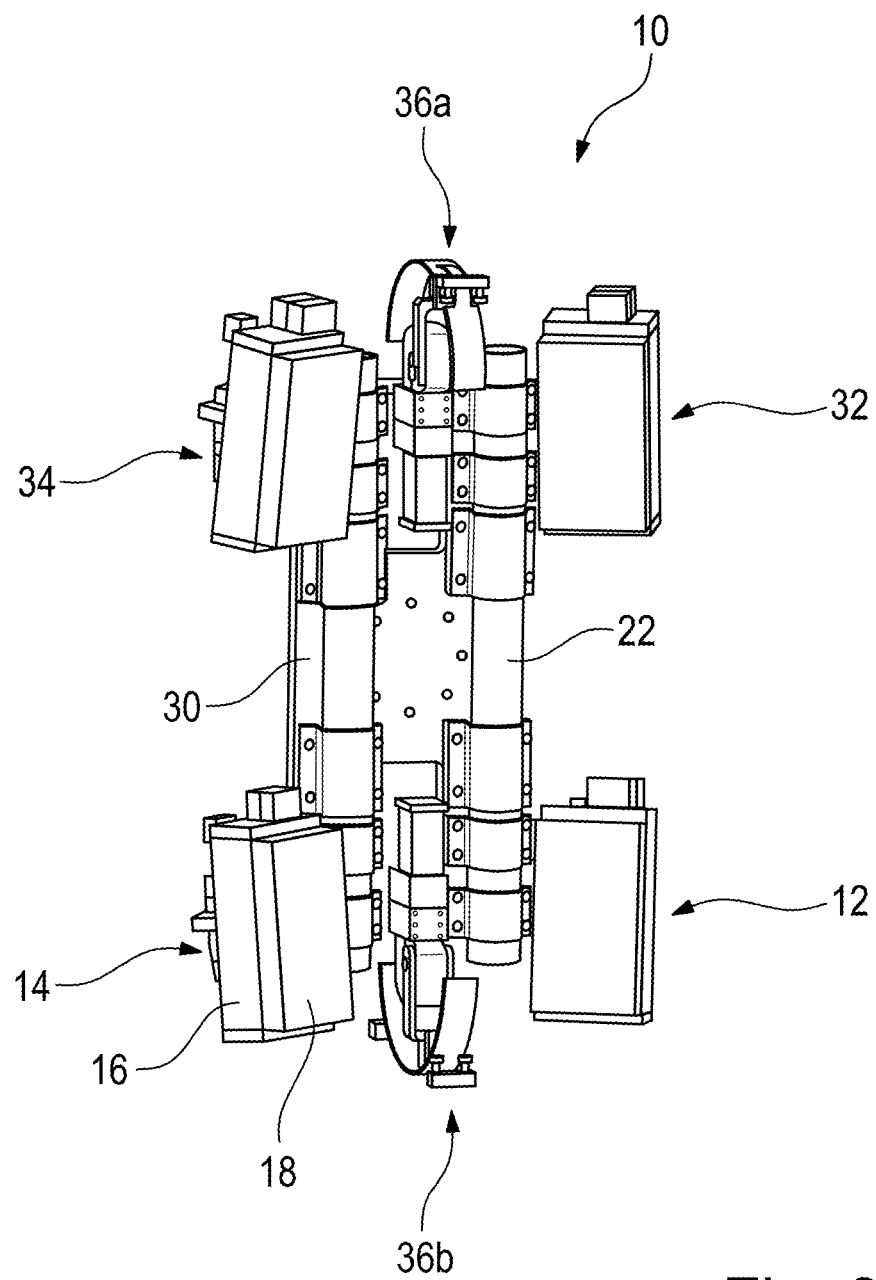
FIG. 8 is a perspective view of the example embodiment of FIG. 7 from a different perspective.

FIG. 8 shows the gripper according to FIG. 7 from a different perspective and without the container. The same reference signs denote the same or similar parts as in FIGS. 5-7 and an additional description is therefore omitted.

Figure 9:
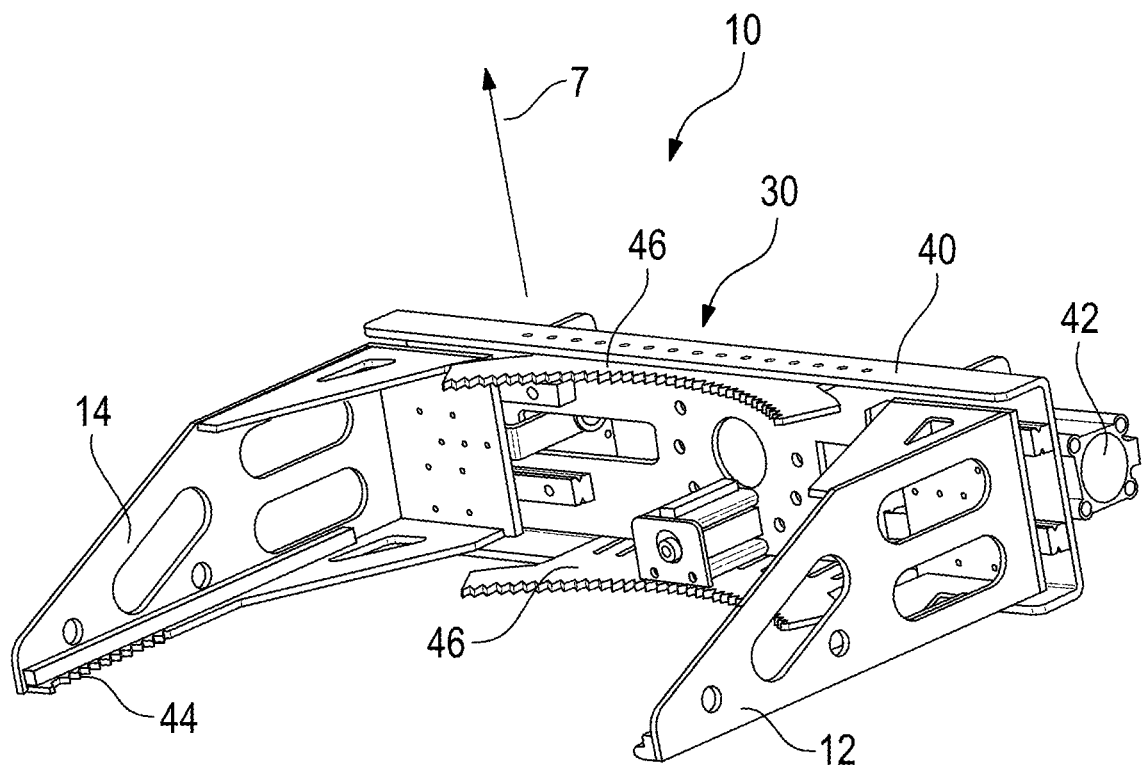
FIG. 9 is a perspective view of a second example embodiment of a gripper according to the present disclosure.

FIG. 9 shows a second example embodiment of a gripper 10 according to the present disclosure. In this embodiment, the gripper 10 is a mechanical gripper.

The gripper 10 comprises a first gripping member 12 and a second gripping member 14 for engaging the outer surface of the elongated container 1. The first and second gripping member 12, 14 form a mechanical clamping and at least one gripping member is movable with respect to the other gripping member.

The first and second gripping member 12, 14 are arranged on a profile 40 which is a connecting member 30 for connecting the first gripping member 12 and the second gripping member 14 to a lifting device. On the profile 40, the first and second gripping member 12, 14 can be moved from an open clamping position into a closed clamping position. During a pick operation, the gripper 10 approaches a container in the open clamping position and picks up the container by moving the gripping members 12, 14 into the closed clamping position.

The outer dimension of the gripper 10 in a direction perpendicular to the elongated direction 7 is defined by the profile 40 and the gripping members 12, 14 in the open clamping position. The outer dimension is smaller than the central width of the elongated container that is to be lifted. The outer dimension of the gripper 10 in a direction perpendicular to the elongated direction 7 can be less than 680 mm. The outer dimension can be less than 650 mm. Thereby, lifting of a container under the conditions described above becomes feasible.

In the embodiment according to FIG. 9, the profile 40 is a straight profile on which the first and the second gripping member 12, 14 are movably arranged. Here, the first and second gripping member 12, 14 are movable laterally in opposite direction in order to move from the open clamping position into the closed clamping position. For moving the gripping members 12, 14, the gripper 10 can comprise pneumatic cylinders 42 arranged on the profile 40 and attached to gripping members 12, 14.

The first and second gripping member 12, 14 can have at least partially a jagged contour 44 for engaging the outer surface of the elongated container. Furthermore, a section having the jagged contour can be a curved section in order to correspond to the convex shape of the elongated container. Furthermore, additional support elements 46 can be arranged on the profile 40 for providing additional support for picking up and moving the container. The additional support elements 46 can also have a jagged contour similar to the first and second gripping member 12, 14. Furthermore, the additional support elements 46 can be arranged rigidly on the profile 40 or moveably to assist the first and second gripping member 12, 14 during a moving operation.

The gripper 10 including the first and second gripping member 12, 14 and the profile 40 can be formed by a lightweight steel frame in order to provide sufficient stability, yet without exceeding a maximum weight of 30 kg. In various implementations, the frame does not extend beyond the dimension of the elongated containers, which are to be lifted. Example dimensions are illustrated with reference to FIGS. 10 and 11.

FIGS. 10 and 11 show the gripper of FIG. 9 in top and side views, respectively. The first and second gripping member are in the open clamping position. In this position, the gripper 10 is U-shaped with the first and second gripping member 12, 14 being arranged perpendicular to profile 40. The profile extends in a longitudinal direction, which is, when the gripper is in picking position, perpendicular to the elongated direction 7 of the container. In the embodiment according to FIGS. 9-11, the length of the profile (L) defines the outer dimension of the gripper 10. The length L is smaller than a center width of the elongated container. In this embodiment, the length L of the profile is 650 mm.

The first and second gripping member 12, 14 each comprise a flat side panel 48, which can be moved along the profile 40 by the pneumatic cylinders 42. On the side panel 48 claws 50 of the same material as the side panel 48 extend perpendicular from the side panel 48. The claws 50 can have a curved and jagged contour 44 for engaging the convex outer surface of the elongated container. Both the side panel 48 and the claws 50 can have cutouts 52 in order to reduce the overall weight of the gripper 10. A length T from a flange 54 to the tips of the gripping members is here 432 mm. A height H of the gripper is here 160 mm and thus considerable small than the height of the elongated container, which is to be lifted.

It shall be noted that the mechanical gripper as shown in FIGS. 9-11 represents only one example of a mechanical gripper. Other embodiments having different clamping mechanisms are conceivable, as long as an outer dimension of the gripper remains less than the central width of the elongated container. In particular, additional supporting elements as described with reference to the pneumatic vacuum gripper are conceivable, which provide additional support during a moving operation of the elongated container and thus after picking up the container with the gripping members.

The gripper, mechanical and pneumatic, as described above can be flanged to a lifting device. In various implementations, the lifting device is an industrial robot, such as a KR120 from Kuka AG. In this case, the gripper is designed as an end of arm tooling device (EOAT), wherein a maximal distance from the flange (which is the connecting member) to the elongated container can be less than 200 mm. Furthermore, the gripper can be designed such that a maximal distance from the flange to a center point of the elongated container is less than 550 mm. Thereby, a robot of the type mentioned before is capable of lifting an elongated container between 50 to 70 kg, when the EOAT (the gripper) weights less than 30 kg.

The phrase at least one of A, B, and C should be construed to mean a logical (A OR B OR C), using a non-exclusive logical OR, and should not be construed to mean "at least one of A, at least one of B, and at least one of C."

Overall, the present invention is not limited by the examples of implementation presented here, but is defined by the following claims.

What is claimed is:

1. An apparatus for lifting an elongated container including a circular top surface, a circular bottom surface parallel to the top surface, and a convex outer surface that connects the top surface and the bottom surface, the elongated container defining a first direction perpendicular to the top and bottom surfaces and a second direction perpendicular to the first direction, the convex outer surface forming a bulge at a center portion of the elongated container along the first direction between the top surface and the bottom surface, an exterior dimension, in the second direction, of the convex outer surface at the bulge defining a width of the elongated container, the apparatus comprising:
a gripper configured to engage the elongated container and including a pneumatic vacuum gripper; and
a mount configured to couple the gripper to a lifting device,
wherein:
the gripper is configured to be actuated for a pick operation in which the gripper engages the elongated container and, by movement of the lifting device, lifts the elongated container,
throughout the pick operation, a maximum dimension of the gripper in the second direction is smaller than the width of the elongated container,
the mount includes:
a plate,
a tube coupled to the plate and parallel to the first direction,
a clamp coupled to the tube, and
a pipe including a first portion parallel to the first direction and a second portion parallel to the second direction,
the pneumatic vacuum gripper is coupled to the tube,
the second portion is coupled to the clamp, and
the first portion is coupled to the pneumatic vacuum gripper by a ball joint.

2. The apparatus of claim 1 further comprising the lifting device.

3. The apparatus of claim 1 wherein:
the first direction is vertical; and
the second direction is horizontal.

4. The apparatus of claim 1 wherein:
the pneumatic vacuum gripper includes a mat defining a plurality of holes configured to communicate a vacuum; and
the mat is configured to engage the convex outer surface.

5. The apparatus of claim 1 wherein the pneumatic vacuum gripper includes a plurality of suction cups configured to engage the convex outer surface.

6. An apparatus for lifting an elongated container including a circular top surface, a circular bottom surface parallel to the top surface, and a convex outer surface that connects the top surface and the bottom surface, the elongated container defining a first direction perpendicular to the top and bottom surfaces and a second direction perpendicular to the first direction, the convex outer surface forming a bulge at a center portion of the elongated container along the first direction between the top surface and the bottom surface, an exterior dimension, in the second direction, of the convex outer surface at the bulge defining a width of the elongated container, the apparatus comprising:
a gripper configured to engage the elongated container and including a pneumatic vacuum gripper; and
a mount configured to couple the gripper to a lifting device,
wherein:
the gripper is configured to be actuated for a pick operation in which the gripper engages the elongated container and, by movement of the lifting device, lifts the elongated container,
throughout the pick operation, a maximum dimension of the gripper in the second direction is smaller than the width of the elongated container,
the pneumatic vacuum gripper includes a first pneumatic vacuum gripper and a second pneumatic vacuum gripper,
the mount includes:
a plate,
a first tube parallel to the first direction and coupled to the first pneumatic vacuum gripper, and
a second tube parallel to the first direction and coupled to the second pneumatic vacuum gripper, the gripper further includes:
a third pneumatic vacuum gripper coupled to the first tube, and
a fourth pneumatic vacuum gripper coupled to the second tube, and
the pick operation further includes rotating the elongated container from a first position in which an axis of the elongated container is parallel to the first direction to a second position in which the axis of the elongated container is parallel to the second direction.

7. An apparatus for lifting an elongated container including a circular top surface, a circular bottom surface parallel to the top surface, and a convex outer surface that connects the top surface and the bottom surface, the elongated container defining a first direction perpendicular to the top and bottom surfaces and a second direction perpendicular to the first direction, the convex outer surface forming a bulge at a center portion of the elongated container along the first direction between the top surface and the bottom surface, an exterior dimension, in the second direction, of the convex outer surface at the bulge defining a width of the elongated container, the apparatus comprising:
a gripper configured to engage the elongated container and including a pneumatic vacuum gripper; and
a mount configured to couple the gripper to a lifting device,
wherein:
the gripper is configured to be actuated for a pick operation in which the gripper engages the elongated container and, by movement of the lifting device, lifts the elongated container;
throughout the pick operation, a maximum dimension of the gripper in the second direction is smaller than the width of the elongated container;
the gripper further includes a clamp including a first clamp portion and a second clamp portion;
the first clamp portion is configured move parallel to the first direction and engage the top surface; and
the second clamp portion is configured to move parallel to the second direction and engage the bottom surface.

8. The apparatus of claim 1 wherein the maximum dimension is less than 680 mm.

9. The apparatus of claim 6 wherein the maximum dimension is less than 680 mm.

10. The apparatus of claim 7 wherein the maximum dimension is less than 680 mm.

11. The apparatus of claim 6 further comprising the lifting device.

12. The apparatus of claim 7 further comprising the lifting device.

13. The apparatus of claim 6 wherein:
the first direction is vertical; and
the second direction is horizontal.

14. The apparatus of claim 7 wherein:
the first direction is vertical; and
the second direction is horizontal.

15. The apparatus of claim 6 wherein:
the first pneumatic vacuum gripper includes a mat defining a plurality of holes configured to communicate a vacuum; and
the mat is configured to engage the convex outer surface.

16. The apparatus of claim 7 wherein:
the pneumatic vacuum gripper includes a mat defining a plurality of holes configured to communicate a vacuum; and
the mat is configured to engage the convex outer surface.

17. The apparatus of claim 6 wherein the first pneumatic vacuum gripper includes a plurality of suction cups configured to engage the convex outer surface.

18. The apparatus of claim 7 wherein the pneumatic vacuum gripper includes a plurality of suction cups configured to engage the convex outer surface.

* * * * *